United States Patent
Yellin et al.

(10) Patent No.: US 11,064,051 B2
(45) Date of Patent: Jul. 13, 2021

(54) SYSTEM AND METHOD FOR LEADER ELECTION IN DISTRIBUTED STORAGE SYSTEMS

(71) Applicant: Vast Data Ltd., Tel Aviv (IL)

(72) Inventors: Ido Yellin, Kfar Saba (IL); Alon Horev, Tel Aviv (IL); Yuval Mintz, Herzlyia (IL); Alex Turin, Kiryat Ono (IL); Renen Hallak, Tenafly, NJ (US)

(73) Assignee: Vast Data Ltd., Tel Aviv (IL)

( * ) Notice: Subject to any disclaimer, the term of this patent is extended or adjusted under 35 U.S.C. 154(b) by 21 days.

(21) Appl. No.: 16/710,416

(22) Filed: Dec. 11, 2019

(65) Prior Publication Data

US 2021/0185150 A1   Jun. 17, 2021

(51) Int. Cl.
*H04L 29/06* (2006.01)
*H04L 29/08* (2006.01)
*H04L 12/24* (2006.01)

(52) U.S. Cl.
CPC .............. *H04L 67/40* (2013.01); *H04L 41/06* (2013.01); *H04L 67/1095* (2013.01); *H04L 67/1097* (2013.01)

(58) Field of Classification Search
CPC .. H04L 67/40; H04L 67/1095–67/1097; H04L 41/06; H04L 41/065
See application file for complete search history.

(56) References Cited

U.S. PATENT DOCUMENTS

| | | | |
|---|---|---|---|
| 10,521,311 B1* | 12/2019 | Greenwood | G06F 11/2028 |
| 10,764,369 B2* | 9/2020 | Wang | H04L 67/1051 |
| 2005/0132154 A1* | 6/2005 | Rao | H04L 67/322 |
| | | | 711/162 |
| 2017/0141971 A1* | 5/2017 | Ainsworth | G06F 11/182 |
| 2017/0149890 A1 | 5/2017 | Shamis et al. | |
| 2017/0366619 A1* | 12/2017 | Schreter | H04L 41/0654 |
| 2017/0373926 A1* | 12/2017 | Shang | H04L 41/0654 |
| 2019/0163764 A1* | 5/2019 | Ioannou | G06F 3/067 |
| 2020/0034048 A1* | 1/2020 | Gupta | G06F 16/11 |
| 2020/0257593 A1* | 8/2020 | Zhou | G06F 11/0727 |

* cited by examiner

*Primary Examiner* — Clayton R Williams

(74) *Attorney, Agent, or Firm* — M&B IP Analysts, LLC

(57) ABSTRACT

Systems and methods for leader election. A disclosed method includes sending, by a first compute node of a plurality of compute nodes, a plurality of remote procedure calls (RPCs) to a plurality of storage boxes according to an order, wherein each of the plurality of RPCs causes a leader election algorithm to execute in one of the plurality of storage boxes; and updating a state of the first compute node to "leader" when a result of executing the leader election algorithm for each of the plurality of RPCs indicates that the first compute node is elected as a leader node.

18 Claims, 6 Drawing Sheets

SYSTEM AND METHOD FOR LEADER ELECTION IN DISTRIBUTED STORAGE SYSTEMS

TECHNICAL FIELD

The present disclosure relates generally to distributed storage systems, and more particularly to leader election in distributed storage systems.

BACKGROUND

In distributed computing, leader election is a process of designating a single entity to perform or organize a task among several distributed nodes. In the distributed storage context, a node may be selected as leader to ensure that two nodes do not increment the same value twice for a single transaction. When developing leader election algorithms, challenges arise in preventing conflicts (e.g., two nodes acting as leader at the same time), reassigning leaders after failures occur, and handling changes such as partitions among nodes.

One particular issue presented by existing solutions is that leader election may be hindered by failure of the nodes responsible for managing leader election. This may result in leaders not being elected during such failures.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for leader election. The method comprises: sending, by a first compute node of a plurality of compute nodes, a plurality of remote procedure calls (RPCs) to a plurality of storage boxes according to an order, wherein each of the plurality of RPCs causes a leader election algorithm to execute in one of the plurality of storage boxes; and updating a state of the first compute node to "leader" when a result of executing the leader election algorithm for each of the plurality of RPCs indicates that the first compute node is elected as a leader node.

Certain embodiments disclosed herein also include a non-transitory computer readable medium having stored thereon causing a processing circuitry to execute a process, the process comprising: sending, by a first compute node of a plurality of compute nodes, a plurality of remote procedure calls (RPCs) to a plurality of storage boxes according to an order, wherein each of the plurality of RPCs causes a leader election algorithm to execute in one of the plurality of storage boxes; and updating a state of the first compute node to "leader" when a result of executing the leader election algorithm for each of the plurality of RPCs indicates that the first compute node is elected as a leader node.

Certain embodiments disclosed herein also include a system for leader election. The system comprises: a processing circuitry; and a memory, the memory containing instructions that, when executed by the processing circuitry, configure the system to: send a plurality of remote procedure calls (RPCs) to a plurality of storage boxes according to an order, wherein each of the plurality of RPCs causes a leader election algorithm to execute in one of the plurality of storage boxes; and update a state of the system to "leader" when a result of executing the leader election algorithm for each of the plurality of RPCs indicates that the system is elected as a leader node.

Certain embodiments disclosed herein also include a method for leader election. The method comprises: executing, by a first storage node of a plurality of storage nodes, a leader election algorithm to determine whether a first compute node of a plurality of compute nodes is elected as leader, wherein the first compute node is elected as leader when a time since a last communication between the first storage node and a known leader node among the plurality of compute nodes is above a threshold, wherein the known leader node is indicated in leader data accessible to the first storage node, wherein the leader data is synchronized among the plurality of storage nodes.

Certain embodiments disclosed herein also include a non-transitory computer readable medium having stored thereon causing a processing circuitry to execute a process, the process comprising: executing, by a first storage node of a plurality of storage nodes, a leader election algorithm to determine whether a first compute node of a plurality of compute nodes is elected as leader, wherein the first compute node is elected as leader when a time since a last communication between the first storage node and a known leader node among the plurality of compute nodes is above a threshold, wherein the known leader node is indicated in leader data accessible to the first storage node, wherein the leader data is synchronized among the plurality of storage nodes.

Certain embodiments disclosed herein also include a system for leader election. The system comprises: a processing circuitry; and a memory, the memory containing instructions that, when executed by the processing circuitry, configure the system to: execute a leader election algorithm to determine whether a first compute node of a plurality of compute nodes is elected as leader, wherein the first compute node is elected as leader when a time since a last communication between the system and a known leader node among the plurality of compute nodes is above a threshold, wherein the known leader node is indicated in leader data accessible to the system, wherein the system is a first storage node of a plurality of storage nodes, wherein the leader data is synchronized among the plurality of storage nodes.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
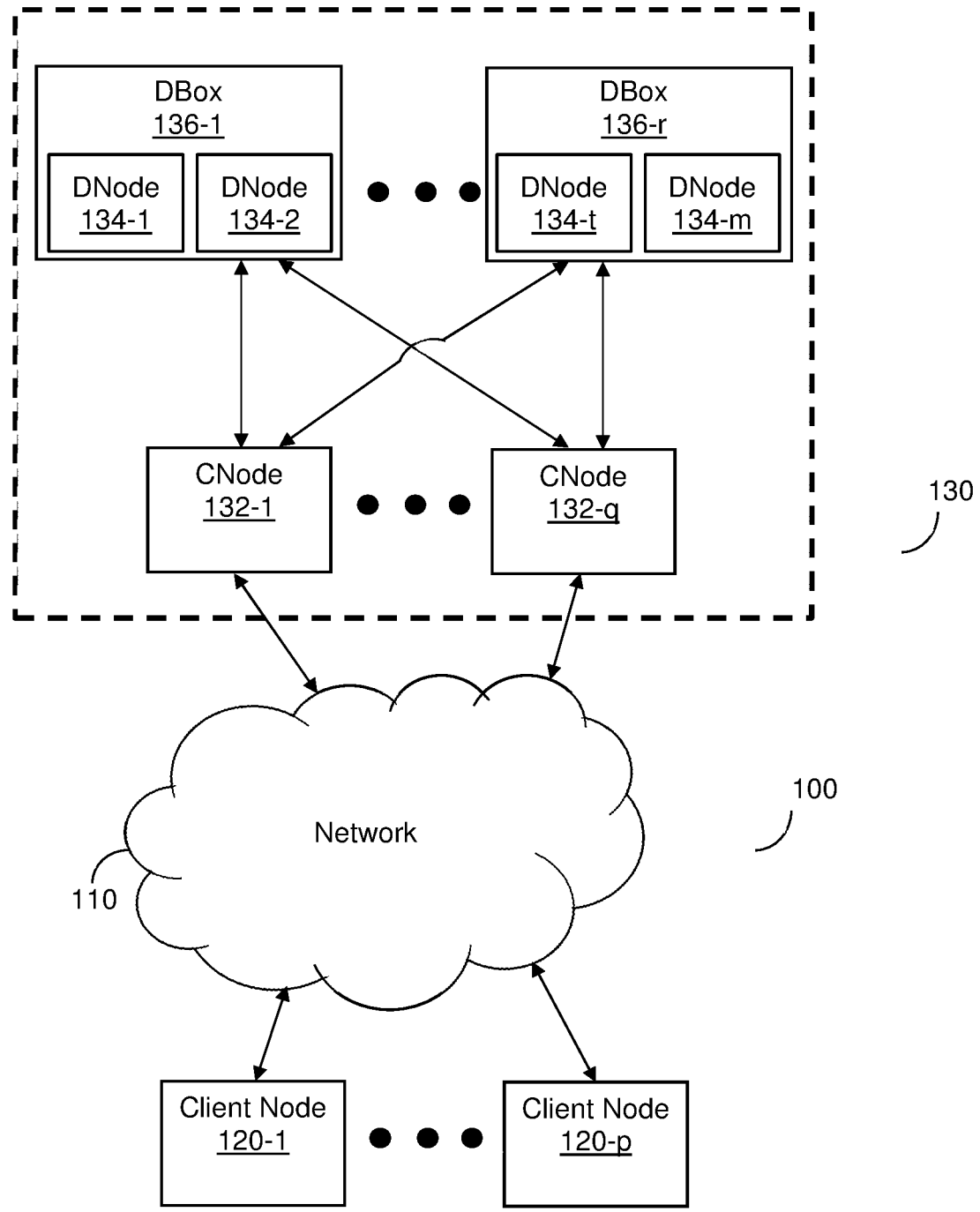
FIG. 1 is an example network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A process for managing a cluster of nodes that would solve the challenges noted above would be desirable. Specifically, allowing for leader election so long as any node capable of acting as leader is available would significantly reduce the number of unsuccessful leader elections. Additionally, providing some redundancy in data related to leader election would help reduce the chance of unsuccessful leader election.

It would be desirable to provide a leader election process that is flexible and can adapt to changes in the nodes such as, for example, changes in network partitions. In this regard, it has been identified that a challenge faced by existing solutions is that only a limited number of nodes (e.g., 50%) may fail without disrupting service. One benefit of the disclosed embodiments is therefore to allow for additional failures while continuing to provide access. For example, every node but one may fail while still providing access.

Other changes, such as shutting down of the entire system in which the leader election is performed, should also be supported. To this end, the disclosed embodiments provide techniques for allowing a leader to be designated such that the leader may resume leadership activities when the system is powered up after a shutdown.

The disclosed embodiments provide systems and methods for performing leader election More specifically, the disclosed embodiments provide techniques for performing leader election using compute and storage nodes. Additionally, the disclosed embodiments provide techniques for adapting leader election to different network partitions among nodes.

The various disclosed embodiments include methods and systems for leader election. The disclosed embodiments are performed in a distributed storage system including compute nodes and storage nodes. Each compute node is at least configured to vote for a leader and to act as a leader when elected. Each storage node is at least configured to store data of the distributed storage system. Each compute node is configured to send remote procedure calls (RPCs) including for causing execution of a leader election algorithm and to perform leader functions when elected leader.

In an embodiment, when leader election is required (e.g., when a node acting as leader has failed), each active compute node communicates with storage boxes according to a predetermined order. The predetermined order allows for converging of leader election such that the elected leader is ultimately agreed upon by all active compute nodes. Each storage box includes one or more storage nodes. To this end, during leader election, an active compute node communicates with a storage box by sending a RPC to one of the storage nodes in the storage box.

The RPC sent to each storage node by each compute node includes instructions that, when executed by the storage node, cause the storage node to perform a leader election algorithm for determining whether the compute node should be leader and returning the results of the determination (e.g., either a designation of leadership or a null response). The determination may be based on whether the storage node has communicated with a known leader node within a threshold period of time. The known leader node is one of the compute nodes that is indicated as the leader node in leader data accessible to the storage node.

If it is determined that a compute node is elected as leader during a round of leader election, the storage node records the designation of the new leader and returns null results of RPCs subsequently sent by other compute nodes. When one of the compute nodes has successfully received leadership designation result from all of the storage boxes (e.g., from one of the storage nodes in each storage box) the compute node has communicated with, the compute node is elected as the new leader and begins to perform leader functions. In an example implementation, leader functions include updating a value representing relative time of activities in the distributed storage system.

In some embodiments, each storage box includes multiple (e.g., 2) storage nodes and a shared portion of memory. The shared portion of memory is used to store data relevant to leader election such that all storage nodes in each storage box share the same leader data. Thus, storage nodes within the same storage box are redundant such that any of those storage nodes may be communicated with during the leader election process and will return the same result as would any other storage node within the same storage box. This provides increased resiliency to problems arising from inaccessibility of particular storage nodes such as, but not limited to, failures.

In various embodiments, the leader election is performed in a distributed storage system having nodes which are differentiated based on function. Specifically, compute nodes configured to send RPCs and perform leader functions as well as storage nodes configured to store data including leader data are used. Thus, the compute nodes are distinct from the storage nodes. The differentiation among types of nodes and separation of at least some responsibilities between the different types of nodes provides additional resiliency to failures since the operation of leader election is not affected by storage node failures and vice-versa.

FIG. 1 is a network diagram 100 illustrating an example distributed storage system utilized to describe various disclosed embodiments. The distributed storage system shown in FIG. 1 is an example distributed storage system to which the various disclosed embodiments could be applied.

The network diagram 100 includes a distributed storage system 130, a network 110, and client nodes 120-1 through 120-$p$ (referred to as a client node 120 or as client nodes 120 for simplicity).

The distributed storage system 130 includes compute nodes (CNodes) 132-1 through 132-$q$ (referred to as a CNode 132 or as CNodes 132 for simplicity) and storage nodes (DNodes) 134-1 through 134-$m$ (referred to as a DNode 134 or as DNodes 134 for simplicity). In an example implementation, the distributed storage system 130 may be configured as described further in U.S. patent application Ser. No. 16/001,576, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DNodes 134 include at least non-volatile memories (e.g., Flash, 3D Xpoint) and volatile memories (e.g., RAM), and may be realized as combinations of volatile and non-volatile memories. The non-volatile memories may be included in, for example, hard-disk drives (HDDs), solid state drives (SSDs), or a combination thereof. In an example implementation, each DNode 134 includes one or more drives containing disks (not shown).

In an embodiment, each DNode 134 is included in a storage box (DBox) among DBoxes 136-1 through 136-r. Each DBox 136 is a storage container including one or more DNodes 134. In a further embodiment, each DBox 136 includes two or more DNodes 134, thereby providing redundancy in case of failure of one of the DNodes 134. In the example implementation shown in FIG. 2, each DBox 136 includes two DNodes 134. The DNodes 134 in each DBox 136 are configured to use shared leader data using one of the techniques described further below such that that the DNodes 134 in each DBox 136 are redundant with each other and, therefore, leader data from each DBox 136 is accessible so long as one of its DNodes 132 has not failed.

The CNodes 132 are configured to access data in the DNodes 134. In some implementations, the CNodes 132 may be configured to collectively act as a distributed transaction manager for accessing data in the DNodes 134. An example schematic diagram of a CNode 132 is described below with respect to FIG. 4.

The client node 120 is configured to send access commands to the distributed storage system 130 via the network 110. The CNodes 132 are configured to receive access commands from the client nodes 120 and to access the DNodes 134 based on the received commands. The access may include translating the received commands into a format supported by the DNodes 134. As a non-limiting example, NVM Express (NVMe) over Fabrics may be utilized to enable such access.

In an example implementation, each CNode 132 is able to access all DNodes 134. In other words, data among the DNodes 134 is shared among all of the CNodes 132 and none of the CNodes 132 "owns" portions of such data to the exclusion of other CNodes 132. In a further example implementation, each CNode 132 is configured to read any data stored in any of the DNodes 134 and is configured to write data to one or more assigned portions of data stored in the DNodes 134.

In an embodiment, a CNode 132 is configured to perform input/output (I/O) operations on the DNodes 134. To this end, each CNode 132 may be configured to participate in the leader election process described herein and, if elected as leader node, to perform leader functions.

The leader node may be responsible for tasks where it would be undesirable to have multiple CNodes 132 performing the same task, for example, when incrementing values to be used as internal time-keeping mechanisms within the distributed storage system. As a non-limiting example, when the system uses a snap value (i.e., a value updated at regular intervals that is used to create a timestamp when data is written or modified) to track relative times of storage activity, it is desirable to only have one of the CNodes 132 write the snap value to ensure that the snap value is not incremented incorrectly and to prevent duplication of work by the CNodes 132.

During leader election, each CNode 132 is configured to access a DNode 134 from each DBox 136 based on a predetermined order as described further herein below. Leader election may be performed upon powering up of the distributed storage system 130 in order to ensure that a leader node is available whenever the distributed storage system 130 is on. If a leader node fails, a new leader node is elected to ensure system integrity.

In an embodiment, each DBox 136 includes multiple DNodes 134. In a further embodiment, the multiple DNodes 134 in each DBox 136 are share leader data such that they are redundant, i.e., such that a RPC sent to any of the DNodes 134 in the same DBox 136 will return the same result. To this end, the DNodes 134 are configured to share leader data by synchronizing the leader data or by storing leader data in a shared storage accessible to all DNodes 134 in each DBox 136. The leader data may be, for example but not limited to, timestamped data indicating an identifier of the current leader.

Synchronizing the leader data may include communicating with other DNodes 134 of the same DBox 136. Synchronizing the leader data may further include receiving a response from each other DNode 134. The response indicates whether the leadership is confirmed or denied (or no response, for example if a DNode 134 has failed). If the DNodes 134 are not in agreement, leader data of one of the DNodes 134 is selected as the correct leader data. The selection may be based on, for example, timestamps of the leader data (e.g., leader data having the most recent timestamp may be selected). For example, the selection may include executing an atomic operation such as compare-and-swap that results in one of the DNodes 134 succeeding over the other. Data is then read from the successful DNode 134.

Figure 5:
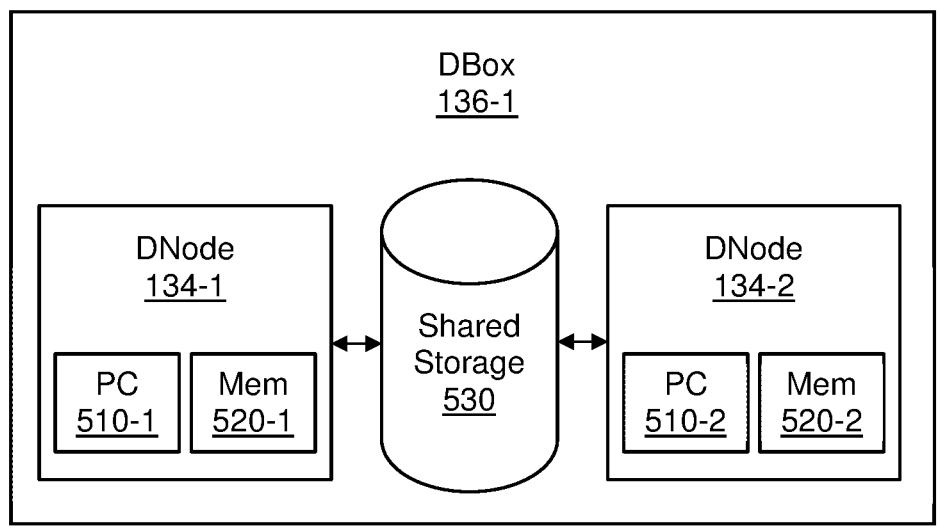
FIG. 5 is a schematic diagram of a storage box according to an embodiment.

Alternatively, the DNodes 134 of the same DBox 136 may store leader data in a shared storage accessible to all of those DNodes 134. An example schematic diagram of utilized to describe this implementation is shown in FIG. 5. In FIG. 5, a DBox 136-1 includes two DNodes 134-1 and 134-2 having a shared storage 530. Each DNode 134-1 includes a processing circuitry 510 and a memory 520. The memory 520 includes instructions that, when executed by the processing circuitry 510, configures its respective DNode 134 to at least perform storage node functions including storing leader data in the shared storage 530.

It should be noted that the embodiments described herein are not limited to the arrangement shown in FIG. 1. For example, storage systems to which the disclosed techniques may be applied are not limited to the particular configuration of the distributed storage system 130. In particular, as explained above, although two DNodes 134 are shown as being included in each DBox 136 for example purposes, the configurations of the DBoxes 136 are not limited to two DNodes 134 and may include one, three, or more DNodes 134 without departing from the scope of the disclosed embodiments.

Figure 2:
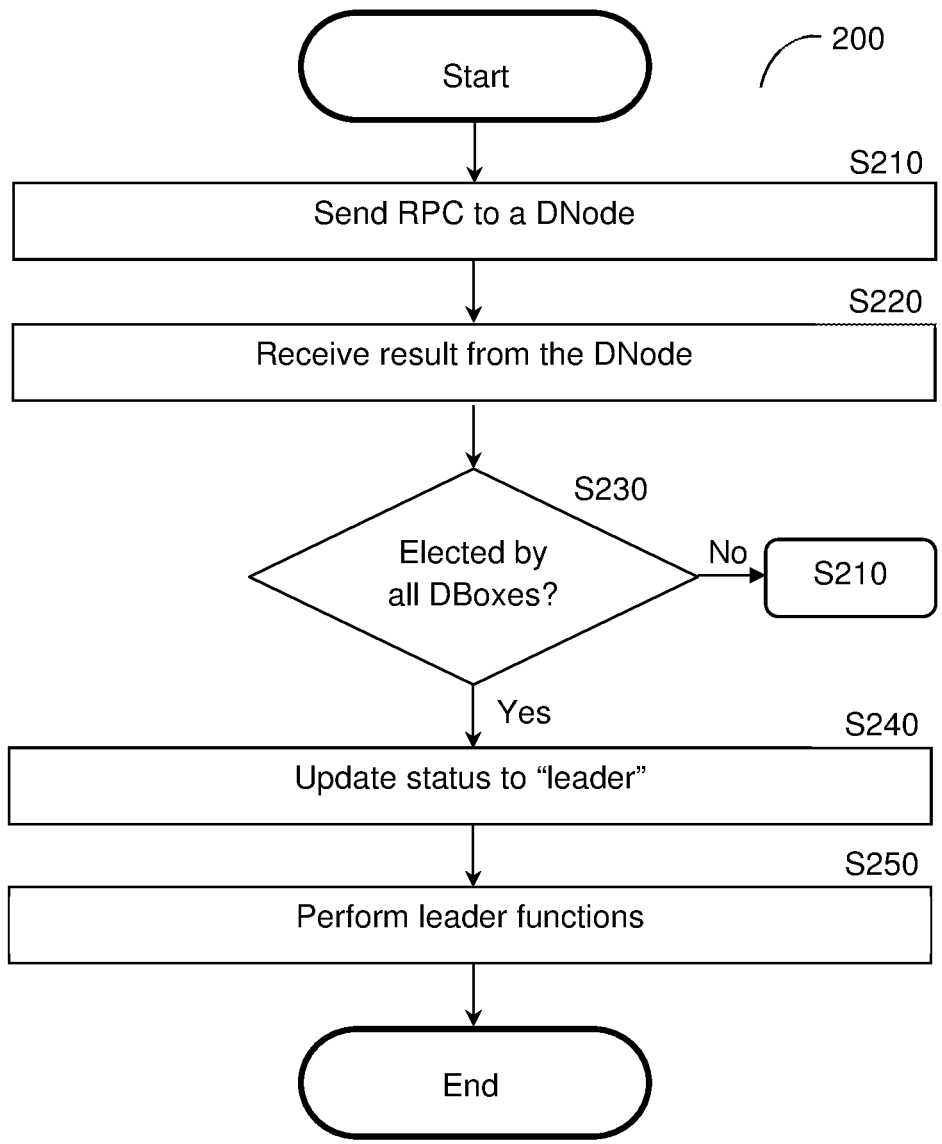
FIG. 2 is a flowchart illustrating a method for requesting leader election according to an embodiment.

FIG. 2 is a flowchart 200 illustrating a method for requesting leader election according to an embodiment. In an embodiment, the method is performed by one of the CNodes 132, FIG. 1. In a further embodiment, the method is independently performed by each CNode 132 that is active except that execution may terminate for non-elected CNodes 132 after a leader node is elected by all DBoxes 136.

At S210, a remote procedure call is sent to a DNode. The remote procedure call causes the DNode to execute a leader election algorithm that checks whether a leader node has communicated with the DNode within a threshold period of time. Based on the check, the DNode executing the leader election algorithm returns a response indicating either a designation of leadership or not (e.g., by returning a null value or an identifier of a known leader node).

In an example implementation, the CNode may send a polling RPC (e.g., when the CNode is turned on, periodically, etc.) that causes a DNode to return a result indicating the current leader node. If the CNode does not receive a response, the CNode may send a polling RPC to another DNode.

In an embodiment, the remote procedure call may be sent when a DNode has not communicated with a leader node within a threshold period of time. To this end, when the DNode has not communicated with a leader node within a threshold period of time, the DNode may send a notification prompting the CNode to execute the leadership election algorithm.

In an embodiment, the remote procedure call is sent to a DNode in the next DBox according to an order of DBoxes. The order may be a predetermined order. When a DBox includes multiple DNodes, which DNode to be sent the RPC may be determined based on, for example, availability (i.e., whether the DNode has failed or is active), network congestion, and the like. As noted above, each DBox may include multiple DNodes having redundant or shared leader data such that executing the leader election algorithm by any of the DNodes in a DBox will produce the same result.

At S220, a result of the leader election algorithm is received from the DNode to which the RPC was sent. The result may be, but is not limited to, either a designation of leadership or a null value.

At S230, it is determined whether the CNode has been elected by all the DBoxes and, if so, execution continues with S240; otherwise, execution continues with S210 where the next RPC is sent to a DNode of the next DBox in the order. In an example implementation, it is determined that the CNode has been elected by all of the DBoxes when the result of executing the leader election algorithm in a DNode of each DBox is a leadership designation. Thus, the first CNode to complete a loop defined by the order of DBoxes is elected as leader.

It should be noted that, at least in some implementations, S230 may include determining whether the CNode has been elected by all DBoxes of a subset of DBoxes. This may be done when, for example, one or more of the DBoxes is down (e.g., when all DNodes in a DBox have failed). In a further example, the subset may require at least a majority of the total set of DBoxes in order for leader election to be completed.

At S240, when the CNode is elected leader by all of the DBoxes, the CNode's status is updated to "leader," for example, in an internal memory of the CNode.

At S250, the CNode begins to perform leader functions such as, but not limited to, incrementing a value used for maintaining time within a distributed storage system.

Figure 3:
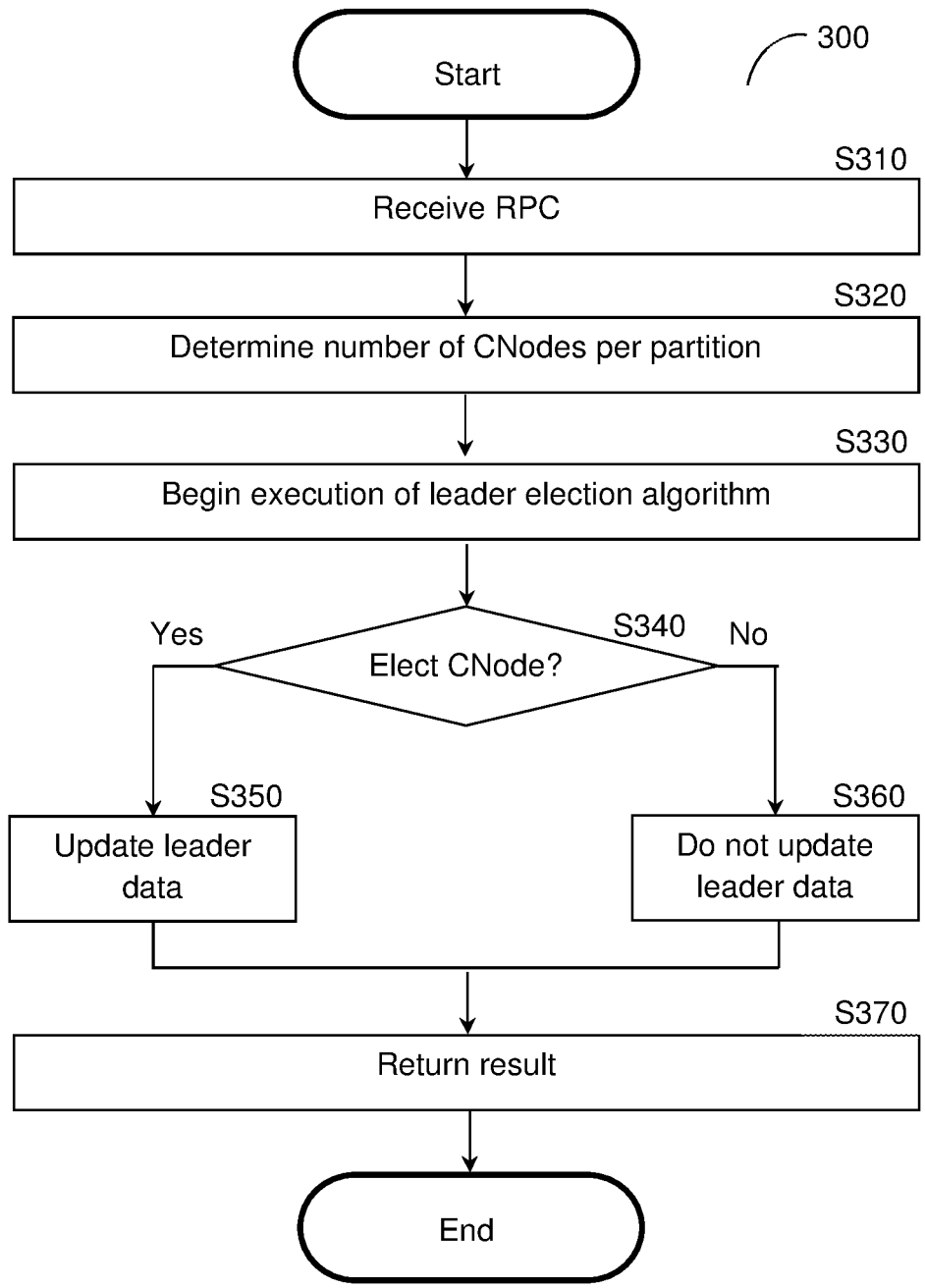
FIG. 3 is a flowchart illustrating a method for synchronizing data used for leader election according to an embodiment.

FIG. 3 is a flowchart 300 illustrating a method for synchronizing data used for leader election according to an embodiment. In an embodiment, the method is performed by one of the DNodes 134, FIG. 1, based on an RPC received from one of the CNodes 132.

At S310, a RPC is received. The RPC causes execution of a leader election algorithm. In an embodiment, the RPC is received from a CNode in a distributed storage system.

At optional S320, sizes of partitions of CNodes are determined. In an embodiment, the number of CNodes in each partition is determined based on partitioning data received from the CNodes. A portion of the partitioning data may be received from each of the CNodes. To this end, the partitioning data at least indicates a number of other CNodes found by each CNode. The number of other CNodes found via communication among the CNodes is used to determine the size of each partition.

At S330, execution of the leader election algorithm begins.

At S340, it is determined if the CNode that sent the RPC should be elected leader and, if so, execution continues with S340; otherwise, execution continues with S350.

In an embodiment, S340 includes determining whether a known leader node (e.g., as indicated in existing leader data) has communicated within a threshold period of time. When a leader has not communicated within the threshold time period, it is determined that the CNode which sent the RPC should be elected as leader; otherwise, it is determined that the CNode which sent the RPC should not be elected leader.

In a further embodiment, the CNode that sent the RPC is only eligible to be elected leader when it is among the largest partition (i.e., the partition including the most CNodes). Thus, if the CNode that sent the RPC is not among the largest partition, S340 results in a "no" result regardless of whether a known leader node has communicated within the threshold period of time. In yet a further embodiment, the partitions considered for purposes of determining whether to elect a CNode only include partitions including one or more CNodes which have communicated within a threshold period of time. This ensures that, for example, CNodes which have failed or otherwise been cut off from communicating are not counted for purposes of determining the largest partition.

If there is a tie for largest partition, whether to elect the CNode may be determined, for example, arbitrarily (e.g., the CNode having the highest identification number among CNodes in the largest partitions may be elected). Alternatively, the first CNode among one of the largest partitions that sent a RPC may be elected.

Figure 6:
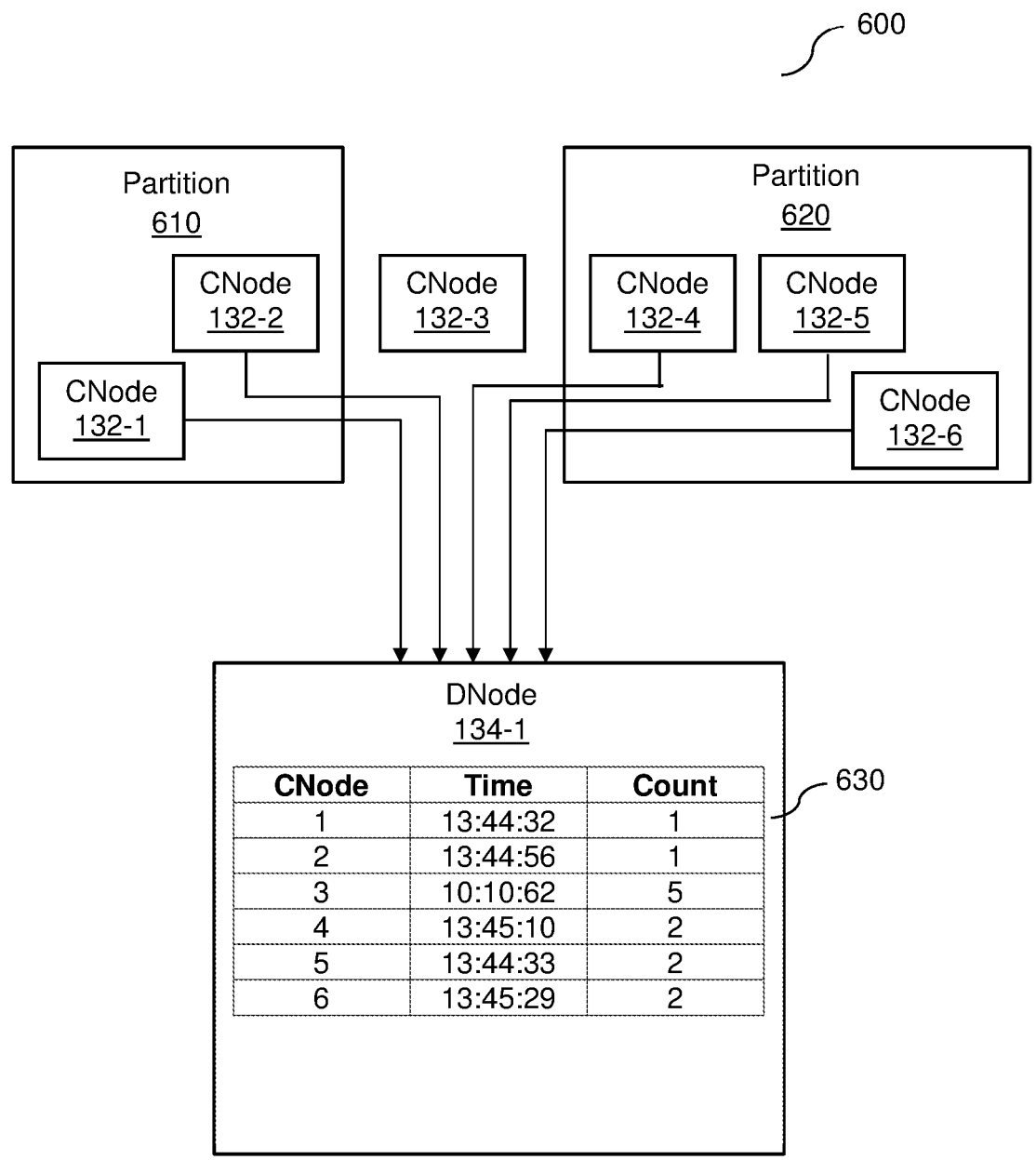
FIG. 6 is a network partition diagram utilized to describe electing leaders based on sizes of partitions.

FIG. 6 is an example network partition diagram 600 utilized to describe electing leaders based on sizes of partitions in accordance with some disclosed embodiments. In FIG. 6, two partitions of CNodes 610 and 620 include respective CNodes 132 which send partitioning data to a DNode 134-1. The DNode 134-1 stores a table 630 including identifiers of the CNodes it has communicated with, timestamps of the most recent time each CNode provided partitioning data, and a number of CNodes found via communication by each CNode.

More specifically, each of the CNodes 132-1 and 132-2 found 1 other CNode, while each of CNodes 132-4, 132-5, and 132-6 found 2 other CNodes. Although CNode 132-3 found the highest number of other CNodes (5), its timestamp is outdated (i.e., older than a threshold period of time) and the partition including the CNode 132-3 is therefore excluded from consideration. Thus, the partition 620 is determined as the largest partition. In an example implementation, the first CNode among the CNodes 132-4, 132-5, and 132-6 is therefore elected leader.

Returning to FIG. 3, at S350, when it is determined that the CNode which sent the RPC should be elected as leader, the leader data is updated. In an example implementation, the leader data is updated with an identifier of the CNode and a timestamp indicating the current time at the time of update.

At S360, when it is determined that the CNode which sent the RPC should be elected as leader, the leader data is not updated.

At S370, the result of determining whether the CNode should be elected leader is returned. In an example implementation, the result is either a leadership designation (i.e., designating the CNode as leader or indicating another CNode that is a known leader node) or a null value.

Figure 4:
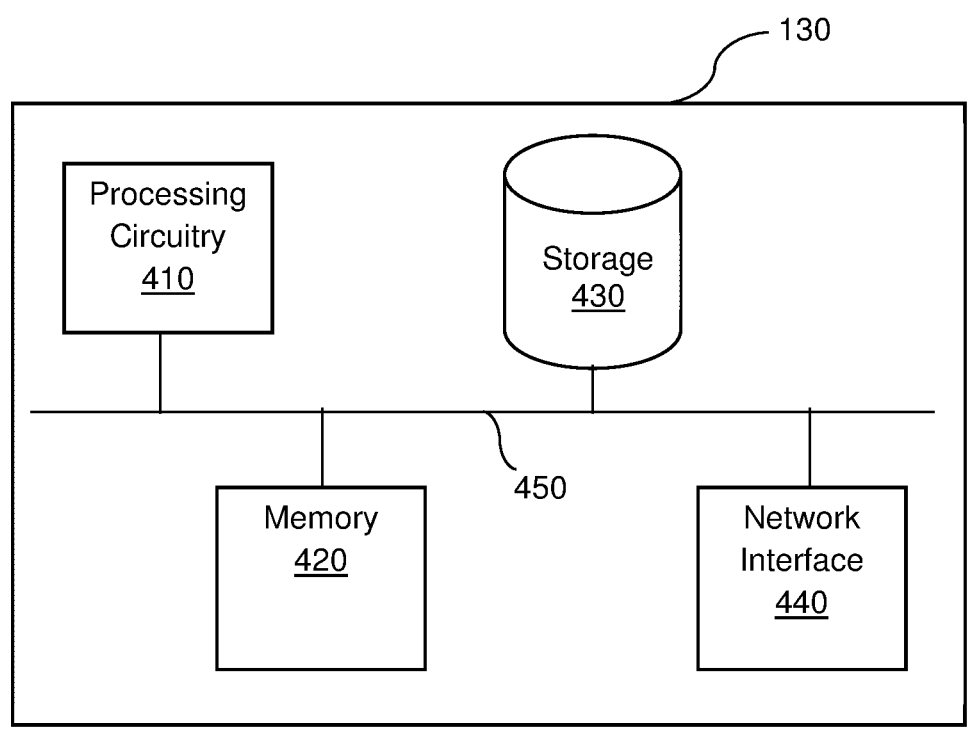
FIG. 4 is a schematic diagram of a compute node according to an embodiment.

FIG. 4 is an example schematic diagram of a CNode 132 according to an embodiment. The CNode 132 includes a processing circuitry 410 coupled to a memory 420, a storage 430, and a network interface 440. In an embodiment, the components of the CNode 132 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the CNode 132 to communicate with the client nodes 120 for the purpose of receiving data to be stored, sending retrieved data, receiving I/O commands to be performed, and the like. The network interface 440 may further allow the CNode 132 to communicate with the DNodes 134 for the purpose of, for example, sending RPCs, sending access commands, receiving leader election responses and data stored in the DNodes 134, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for leader election, comprising:
sending, by a first compute node of a plurality of compute nodes, a plurality of remote procedure calls (RPCs) to a plurality of storage boxes according to an order, wherein each of the plurality of RPCs causes a leader election algorithm to execute in one of the plurality of storage boxes; and
updating a state of the first compute node to "leader" when a result of executing the leader election algorithm for each of the plurality of RPCs indicates that the first compute node is elected as a leader node.

2. The method of claim 1, wherein each storage box includes at least one storage node, wherein the leader election algorithm executed in each of the plurality of storage boxes is executed by one of the at least one storage node of the storage box.

3. The method of claim 2, wherein each storage box includes at least two storage nodes, wherein the at least two storage nodes of each storage box share leader data.

4. The method of claim 2, wherein the leader election algorithm, when executed by a first storage node of a first storage box of the plurality of storage boxes, causes the first storage node to return a result indicating that the first compute node is elected leader when at least a predetermined period of time has passed since the first storage node has communicated with a known leader node of the plurality of compute nodes.

5. The method of claim 2, wherein the plurality of storage boxes includes a plurality of storage nodes, wherein the plurality of compute nodes is distinct from the plurality of storage nodes.

6. A non-transitory computer readable medium having stored thereon instructions for causing a processing circuitry to execute a process, the process comprising:
    sending, by a first compute node of a plurality of compute nodes, a plurality of remote procedure calls (RPCs) to a plurality of storage boxes according to an order, wherein each of the plurality of RPCs causes a leader election algorithm to execute in one of the plurality of storage boxes; and
    updating a state of the first compute node to "leader" when a result of executing the leader election algorithm for each of the plurality of RPCs indicates that the first compute node is elected as a leader node.

7. A system for leader election, comprising:
    a processing circuitry; and
    a memory, the memory containing instructions that, when executed by the processing circuitry, configure the system to:
    send a plurality of remote procedure calls (RPCs) to a plurality of storage boxes according to an order, wherein each of the plurality of RPCs causes a leader election algorithm to execute in one of the plurality of storage boxes; and
    update a state of the system to "leader" when a result of executing the leader election algorithm for each of the plurality of RPCs indicates that the system is elected as a leader node.

8. The system of claim 7, wherein each storage box includes at least one storage node, wherein the leader election algorithm executed in each of the plurality of storage boxes is executed by one of the at least one storage node of the storage box.

9. The system of claim 8, wherein each storage box includes at least two storage nodes, wherein the at least two storage nodes of each storage box share leader data.

10. The system of claim 8, wherein the leader election algorithm, when executed by a first storage node of a first storage box of the plurality of storage boxes, causes the first storage node to return a result indicating that the system is elected leader when at least a predetermined period of time has passed since the first storage node has communicated with a known leader node of the plurality of compute nodes.

11. The system of claim 8, wherein the system is a first compute node of a plurality of compute nodes, wherein the plurality of storage boxes includes a plurality of storage nodes, wherein the plurality of compute nodes is distinct from the plurality of storage nodes.

12. A method for leader election, comprising:
    executing, by a first storage node of a plurality of storage nodes, a leader election algorithm to determine whether a first compute node of a plurality of compute nodes is elected as leader, wherein the first compute node is elected as leader when a time since a last communication between the first storage node and a known leader node among the plurality of compute nodes is above a threshold, wherein the known leader node is indicated in leader data accessible to the first storage node, wherein the leader data is synchronized among the plurality of storage nodes, wherein the leader data is stored in a shared storage that is accessible to each of the plurality of storage nodes, and wherein the shared storage includes a plurality of data paths, wherein at least one data path of the plurality of data paths is a redundant data path to the leader data.

13. The method of claim 12, further comprising:
    communicating, by the first storage node, with at least one second storage node of the plurality of storage nodes in order to synchronize the leader data.

14. The method of claim 12, wherein communicating with the at least one second storage node further comprises:
    sending, from the first storage node to each of the at least one second storage node, an indicator of leadership status, wherein each of the at least one second storage node returns either a confirmation or a denial of the leadership status, wherein the leader data is determined based on the confirmation or denial returned by each of the at least one second storage node.

15. A non-transitory computer readable medium having stored thereon instructions for causing a processing circuitry to execute a process, the process comprising:
    executing, by a first storage node of a plurality of storage nodes, a leader election algorithm to determine whether a first compute node of a plurality of compute nodes is elected as leader, wherein the first compute node is elected as leader when a time since a last communication between the first storage node and a known leader node among the plurality of compute nodes is above a threshold, wherein the known leader node is indicated in leader data accessible to the first storage node, wherein the leader data is synchronized among the plurality of storage nodes, wherein the leader data is stored in a shared storage that is accessible to each of the plurality of storage nodes, and wherein the shared storage includes a plurality of data paths, wherein at least one data path of the plurality of data paths is a redundant data path to the leader data.

16. A system for leader election, comprising:
    a processing circuitry; and
    a memory, the memory containing instructions that, when executed by the processing circuitry, configure the system to:
    execute a leader election algorithm to determine whether a first compute node of a plurality of compute nodes is elected as leader, wherein the first compute node is elected as leader when a time since a last communication between the system and a known leader node among the plurality of compute nodes is above a threshold, wherein the known leader node is indicated in leader data accessible to the system, wherein the system is a first storage node of a plurality of storage nodes, wherein the leader data is synchronized among the plurality of storage nodes, wherein the leader data is stored in a shared storage that is accessible to each of the plurality of storage nodes, and wherein the shared storage includes a plurality of data paths, wherein at least one data path of the plurality of data paths is a redundant data path to the leader data.

17. The method of claim 16, further comprising:
communicating, by the first storage node, with at least one second storage node of the plurality of storage nodes in order to synchronize the leader data.

18. The method of claim 16, wherein communicating with the at least one second storage node further comprises:
sending, from the first storage node to each of the at least one second storage node, an indicator of leadership status, wherein each of the at least one second storage node returns either a confirmation or a denial of the leadership status, wherein the leader data is determined based on the confirmation or denial returned by each of the at least one second storage node.

\* \* \* \* \*